United States Patent
Huang et al.

(10) Patent No.: US 9,237,359 B2
(45) Date of Patent: Jan. 12, 2016

(54) FILTERING VIDEO DATA IN VIDEO CODING

(71) Applicant: QUALCOMM Incorporated, San Diego, CA (US)

(72) Inventors: Ling Feng Huang, San Diego, CA (US); Ravikanth Challagulla, San Diego, CA (US); Cheng-Teh Hsieh, San Diego, CA (US); Eric Michael Lutz, San Diego, CA (US); Rohan Prakash Mallya, San Diego, CA (US); Sumit Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 14/036,907

(22) Filed: Sep. 25, 2013

(65) Prior Publication Data
US 2015/0085916 A1 Mar. 26, 2015

(51) Int. Cl.
*G06K 9/40* (2006.01)
*H04N 19/80* (2014.01)
*H04N 19/70* (2014.01)
*H04N 19/86* (2014.01)

(52) U.S. Cl.
CPC .............. *H04N 19/80* (2014.11); *H04N 19/70* (2014.11); *H04N 19/865* (2014.11)

(58) Field of Classification Search
CPC ...... H04N 19/70; H04N 19/80; H04N 19/865
See application file for complete search history.

(56) References Cited

U.S. PATENT DOCUMENTS

| | | | |
|---|---|---|---|
| 7,508,448 B1* | 3/2009 | Lew et al. | 348/448 |
| 2008/0056389 A1* | 3/2008 | Chiang et al. | 375/240.29 |
| 2013/0034169 A1 | 2/2013 | Sadafale et al. | |
| 2013/0044809 A1 | 2/2013 | Chong et al. | |
| 2013/0051455 A1 | 2/2013 | Sze et al. | |
| 2014/0341271 A1* | 11/2014 | Mody et al. | 375/240.02 |

FOREIGN PATENT DOCUMENTS

| | | |
|---|---|---|
| WO | 2012167711 A1 | 12/2012 |
| WO | 2012175196 A1 | 12/2012 |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.

(Continued)

Primary Examiner — Phuoc Tran
(74) Attorney, Agent, or Firm — Shumaker & Sieffert, P.A.

(57) ABSTRACT

In an example, a method for filtering pixel data in video coding comprises determining a pixel filtering task from a plurality of pixel filtering tasks for filtering the pixel data, wherein each filtering task of the plurality of pixel filtering tasks is based on an instruction set for a programmable instruction set based controller, and executing the determined filtering task on the pixel data.

37 Claims, 9 Drawing Sheets

(56) References Cited

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

ITU-T H.263, Series H: Audiovisual and Multimedia Systems, Infrastructure of audiovisual services—Coding of moving video, Advanced video coding for generic audiovisual services, The International Telecommunication Union. Jan. 2005, 226 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

\* cited by examiner

| Op Code | Param 1 | Param 2 | Param 3 |
|---|---|---|---|
| Fetch | Internal Buffer Loc | Scratch Loc | |
| BS_Cal | Scratch Loc # 1 | Scratch Loc # 2 | hevc |
| Save | Scratch Loc | Internal Buffer Loc | |

FIG. 5A

| Op Code | Param 1 | Param 2 | Param 3 |
|---|---|---|---|
| Fetch | Internal Buffer Loc | Scratch Register Loc | |
| BS_Cal | Scratch Loc # 1 | Scratch Loc # 2 | H_264 |
| Save | Scratch Register Loc | Internal Buffer Loc | |

FIG. 5B

| Instruction Count | Opcode | Branch_EN | Wait_On/Branch Status bit | Source/Branch Address | Source_Address | Destination | ...... | Param_N |
|---|---|---|---|---|---|---|---|---|
| 1 | FETCH | 0 | NONE | INPUT_MEM | 0x0 | REG_0 | ...... | ...... |
| 2 | FETCH | 0 | NONE | INPUT_MEM | 0x4 | REG_1 | ...... | ...... |
| 3 | FETCH | 0 | NONE | INPUT_MEM | 0x8 | REG_2 | ...... | ...... |
| 4 | FETCH | 0 | NONE | CBUF | 0x0 | LEFT_0 | ...... | ...... |
| 5 | FETCH | 0 | NONE | CBUF | 0x4 | RIGHT_0 | ...... | ...... |
| 6 | FETCH | 0 | SAVE_5 | PRE_DB_MEM | 0x10 | REG_0 | ...... | ...... |
| 7 | FETCH | 0 | SAVE_5 | DB_MEM | 0x14 | REG_1 | ...... | ...... |
| 8 | FETCH | 0 | SAVE_5 | PRE_DB_MEM | 0x18 | REG_2 | ...... | ...... |
| 9 | FETCH | 0 | SAVE_5 | CBUF | 0x10 | LEFT_0 | ...... | ...... |
| 10 | FETCH | 0 | SAVE_5 | CBUF | 0x14 | RIGHT_0 | ...... | ...... |
| 11 | FETCH | 1 | C_REG[1] | 0x10 | --na-- | --na-- | ...... | ...... |
|  | EOB |  |  |  |  |  |  |  |

FIG. 5C

| Instruction Count | Instruction | Branch En | Wait_On/Branch Status bit | Left | Right | IndecB | IndexTc | BS | Param_N |
|---|---|---|---|---|---|---|---|---|---|
| 1 | FILTER | 0 | FETCH_5 | REG_0 | REG_1 | CU_1 | CU_1 | EDGE_1 | ...... |
| 2 | FILTER | 0 | FETCH_5 | REG_2 | REG_3 | CU_2 | CU_2 | EDGE_2 | ...... |
| 3 | FILTER | 0 | FETCH_5 | REG_4 | REG_5 | CU_3 | CU_3 | EDGE_3 | ...... |
| 7 | FILTER | 1 | F_[0] | 0x28 | | | | | |
| .. | | | | | | | | | |
| . | EOB | | | | | | | | |

FIG. 5D

| Instruction Count | Instruction | Wait_On/Branch Status bit | Source / Branch Address | Destination | Destination Address | ...... | Param_N |
|---|---|---|---|---|---|---|---|
| 1 | SAVE | SAO_3 | REG_0 | OUTPUT_MEM | 0x0 | ...... | ...... |
| 2 | SAVE | SAO_3 | REG_1 | OUTPUT_MEM | 0x4 | ...... | ...... |
| 3 | SAVE | SAO_3 | REG_2 | OUTPUT_MEM | 0x8 | ...... | ...... |
| 4 | SAVE | SAO_3 | LEFT_0 | LBUF | 0x0 | ...... | ...... |
| 5 | SAVE | SAO_3 | RIGHT_0 | RBUF | 0x4 | ...... | ...... |
| 6 | SAVE | SAO_6 | REG_0 | OUTPUT_MEM | 0x10 | ...... | ...... |
| 7 | SAVE | SAO_6 | REG_1 | OUTPUT_MEM | 0x14 | ...... | ...... |
| 8 | SAVE | SAO_6 | REG_2 | OUTPUT_MEM | 0x18 | ...... | ...... |
| 9 | SAVE | SAO_6 | LEFT_0 | LBUF | 0x10 | ...... | ...... |
| 10 | SAVE | SAO_6 | RIGHT_0 | RBUF | 0x14 | ...... | ...... |
| 11 | SAVE | D_[34] | 0x0 | | | | |
| .. | | | | | | | |
| . | EOB | | | | | | |

FIG. 5E

| Inst. Ct. | Inst. | Branch | Wait_On/ Branch Status bit | Left Pixels | Right Pixels | Top_ Pixels | Curr_ Pixels | Bottom_ Pixels | Orig. Pixels | SAO_PARA MS | Param_ N |
|---|---|---|---|---|---|---|---|---|---|---|---|
| 1 | SAO | SAO_Offset_ Add | FETCH_5 | LEFT_0 | RIGHT_0 | REG_0 | REG_1 | REG_2 | NONE | SAO_LCU1 | ...... |
| 2 | SAO | SAO_Offset_ Add | FETCH_5 | LEFT_0 | RIGHT_0 | REG_2 | REG_0 | REG_1 | NONE | SAO_LCU1 | ...... |
| 3 | SAO | SAO_Offset_ Add | FETCH_5 | LEFT_0 | RIGHT_0 | REG_1 | REG_2 | REG_0 | NONE | SAO_LCU1 | ...... |
| 4 | SAO | SAO_Offset_ Add | FETCH_10 | LEFT_0 | RIGHT_0 | REG_0 | REG_1 | REG_2 | NONE | SAO_LCU1 | ...... |
| 5 | SAO | SAO_Offset_ Add | FETCH_10 | LEFT_0 | RIGHT_0 | REG_2 | REG_0 | REG_1 | NONE | SAO_LCU1 | ...... |
| 6 | SAO | SAO_Offset_ Add | FETCH_10 | LEFT_0 | RIGHT_0 | REG_1 | REG_2 | REG_0 | | SAO_LCU1 | |
| 7 | SAO | BRANCH | F_[0] | 0x28 | | | | | | | |
| .. | | | | | | | | | | | ...... |
| . | | | | | | | | | | | |
| 28 | SAO | SAO_Stats | DEBLOCKI NG_34 | L0 | R0 | Line0 | Line1 | Line2 | Line3 | | |
| 29 | SAO | SAO_Stats | DEBLOCKI NG_35 | L4 | R4 | Line4 | Line5 | Line6 | Line7 | | |
| 30 | SAO | SAO_Stats | DEBLOCKI NG_36 | L8 | R8 | Line0 | Line1 | Line3 | Line3 | | |
| . | EOB | | | | | | | | | | |

FILTERING VIDEO DATA IN VIDEO CODING

TECHNICAL FIELD

This disclosure relates to video coding, and more particularly to techniques for filtering video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to pixel filtering in a video coding process. For example, the techniques of this disclosure include performing a plurality of filtering operations using a programmable instruction set-based controller. The programmable architecture may provide flexible control of filtering operations, thereby allowing the same architecture to support the control of multiple filtering tasks (e.g., pixel edge boundary strength generation, deblocking pixel filtering, sample adaptive offset (SAO) statistics gathering and offset application, or the like), as well as multiple video coding standards.

In an example, a method of filtering pixel data in video coding comprises determining a pixel filtering task from a plurality of pixel filtering tasks for filtering the pixel data, wherein each filtering task of the plurality of pixel filtering tasks is based on an instruction set for a programmable instruction set based controller, and executing the determined filtering task on the pixel data.

In another example, an apparatus for filtering pixel data in video coding comprises one or more processors configured to determine a pixel filtering task from a plurality of pixel filtering tasks for filtering the pixel data, wherein each filtering task of the plurality of pixel filtering tasks is based on an instruction set for the one or more processors, and execute the determined filtering task on the pixel data.

In another example, an apparatus for filtering pixel data in video coding comprises means for determining a pixel filtering task from a plurality of pixel filtering tasks for filtering the pixel data, wherein each filtering task of the plurality of pixel filtering tasks is based on an instruction set for a programmable instruction set based controller, and means for executing the determined filtering task on the pixel data.

In another example, a non-transitory computer-readable medium storing instructions that, when executed, cause one or more processors to determine a pixel filtering task from a plurality of pixel filtering tasks for filtering the pixel data, wherein each filtering task of the plurality of pixel filtering tasks is based on an instruction set for a programmable instruction set based controller, and execute the determined filtering task on the pixel data.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 5A illustrates an example boundary strength task set, according to aspects of this disclosure.

FIG. 5B illustrates another example boundary strength task set, according to aspects of this disclosure.

FIG. 5C illustrates and example fetch task set, according to aspects of this disclosure.

FIG. 5D illustrates an example deblocking task set, according to aspects of this disclosure.

FIG. 5E illustrates an example save task set, according to aspects of this disclosure.

FIG. 5F illustrates an example SAO task set, according to aspects of this disclosure.

DETAILED DESCRIPTION

Figure 1:
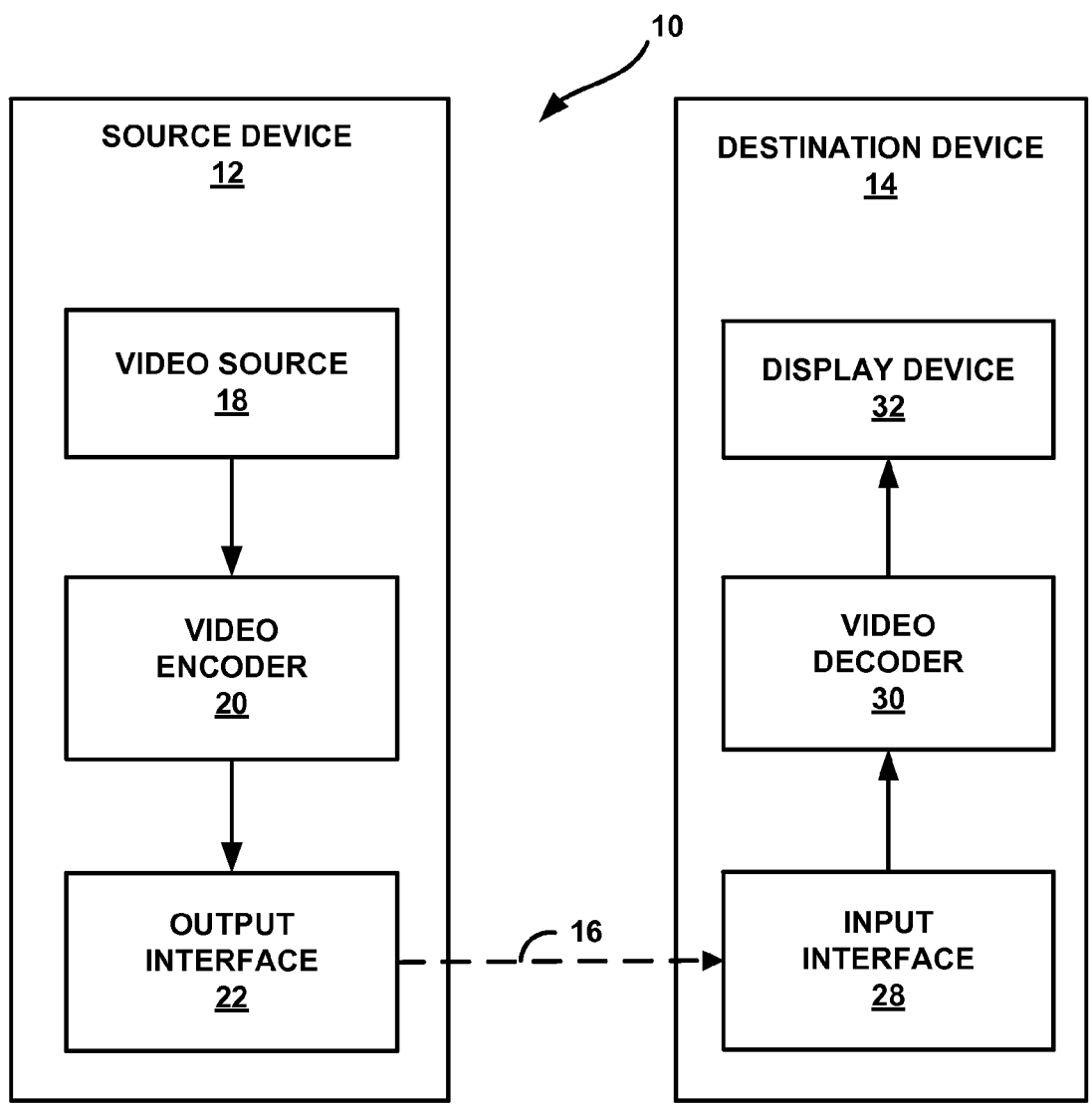
FIG. 1 is a block diagram illustrating an example video encoding and decoding system that may implement the techniques of this disclosure.

Certain video coding techniques may result in a reconstruction error. In some instances, filtering may be applied in a video coding process to compensate for the reconstruction error. For example, blocking artifacts may be present in block-based video coding. To address blocking artifacts, a video coder (video encoder and/or video decoder) may perform pixel edge filtering operations to smooth the block edges. The filtering operations are typically specified by filter parameters such as boundary strengths and edge thresholds. The parameters can change dynamically from one pixel edge to the next pixel edge and from one video coding standard to another. As such, a video coder calculates the boundary strengths and edge thresholds prior to performing the actual filtering operation. These boundary strength and edge threshold calculations may take place in the same pipeline stage as the filtering operations of a video coding process (referred to as "inline") or in a stage prior to the filtering.

After generating the boundary strengths, the video coder may perform the actual pixel filtering. Some conventional deblocking implementations may use hardwired control logic to transfer values of the relevant pixels from external and/or internal storage elements (relative to the video coder), select the correct deblocking parameters, and store the values of the deblocked pixels back into external and/or internal storage elements.

In some instances, the video coder may also apply a Sample Adaptive Offset (SAO) filtering process. SAO may be performed within the coding process (in-loop) and may reduce the distortion between the post deblocked pixels and the original pixels by adding an offset to the pixels. The video coder may determine the offset for each pixel based on a pixel classification. In some instances, the video coder may form a pixel classification based on edge properties (e.g., by comparison of a current pixel with neighboring pixels), which may be referred to as an edge offset. In other instances, the video coder may form a pixel classification based on pixel intensities, which may be referred to as a band offset. SAO parameters typically remain constant for a given unit of video data, such as a largest coded unit (LCU) as defined according to the High Efficiency Video Coding (HEVC) standard, as described in greater detail below.

In general, filtering processes (such as deblocking, SAO, or other filtering processes) are not unified across different video coders (a video encoder/decoder, typically referred to as a "codec"). For example, the control logic for fetching and selectively multiplexing the correct data (e.g., pixels, motion vectors, quantization parameters, and the like) and sending the data to the boundary strength generation datapaths, deblocking pixel filtering datapaths, pixel statistics gathering engine (e.g., for SAO encode), and offset application engine (e.g., for SAO encode and SAO decode) may be hardwired and specific to the processing capabilities of the datapath implemented. In general, a "datapath" includes one or more functional units (e.g., arithmetic logic units (ALUs), summers, multipliers, or the like) for performing data processing operations. In addition, the paths for sending boundary strength values, post-deblocking pixels and/or SAO pixels to external memory may also be hardwired and specific to the processing capabilities of the datapath implemented. Accordingly, adding support for a new codec may require changes to the datapath or one or more new datapaths, both of which may require a redesign of control logic.

In addition, boundary strength (BS) generation and pixel deblocking hardwired control logic does not permit configurability in the BS generation/deblocking order within a given unit of video data (e.g., macroblock (MB), coding unit (CU), or LCU) to aid optimal and parallel deblocking Certain SAO hardwired control logic also does not permit configurability of the pixel statistics gathering algorithm to use different approaches (e.g., such as implementing a sub-optimal approach, as discussed in greater detail below). Thus, in general, hardwired control logic for filtering processes prevents the re-usability of a particular implementation for multiple codecs and/or future codecs not yet developed.

Aspects of this disclosure generally relate to a unified programmable architecture for performing filtering operations. As described herein, filtering operations may include any combination of techniques associated with manipulating pixel data to remove or compensate for coding artifacts (e.g., reconstruction error). For example, aspects of this disclosure relate to an instruction set based scalable architecture that performs control operations for pixel edge boundary strength generation, deblocking pixel filtering, and SAO pixel statistics gathering and offset application. In other examples, the programmable architecture may perform other filtering operations. The programmable architecture, as described in greater detail below, may be scalable across different video codecs.

In an example, the architecture includes multiple task RAMs that each hold a task set (e.g., a sequence of one or more instructions from an instruction set) specifically constructed for a particular encoder-decoder (codec) architecture. The task set may be built using the underlying instructions from an instruction set. For example, the instruction set may include FETCH, OPERATIONS (e.g., boundary strength, deblocking, or SAO specific operations) and/or SAVE commands. A sequence of commands may constitute a task set and may be stored in a corresponding task RAM. The number of task RAMs may be configured based on the throughput requirements of the particular video coding device being designed.

In this way, a video coder (such as a video encoder or a video decoder) may determine a pixel filtering task from a plurality of pixel filtering tasks for filtering pixel data. The video coder may determine the pixel filtering task according to a video coding process (e.g., determine, during coding, when to perform pixel edge boundary strength generation, deblocking pixel filtering, and SAO pixel statistics gathering and offset application according to the particular video coding process being executed). Each filtering task of the plurality of pixel filtering tasks is based on an instruction set for a programmable instruction set based controller included in the video coder. The video coder may also, after determining the pixel filtering task, execute the determined filtering task on the pixel data.

According to aspects of this disclosure, the programmable architecture has potential to be used for multiple, different codecs with minor changes to control logic. Moreover, the techniques may ease the verification effort for the control and decode logic during the design cycle.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing filtering in video coding may be performed by any digital video encoding and/or decoding device. Although generally the techniques of this disclosure are performed by a video encoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

The JCT-VC is working on development of the HEVC standard. While the techniques of this disclosure are not limited to any particular coding standard, the techniques may be relevant to the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, in HEVC, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

In some instances, video encoder 20 and/or video decoder 30 may perform one or more filtering processes on the video data during coding, e.g., to compensate for errors introduced by the coding process. For example, video encoder 20 and/or video decoder 30 may perform pixel edge filtering operations to smooth the block edges, which may be referred to as deblocking. In another example, video encoder 20 and/or video decoder 30 may perform SAO, which may reduce the distortion between the post deblocked pixels and the original pixels by adding an offset to the pixels.

Video coding devices (such as video encoder 20 and/or video decoder 30) may use hardwired control logic to carry out filtering processes. For example, video coding devices may use hardwired control logic to transfer pixels and other data (e.g., motion vectors, quantization parameters, and the like) from external and/or internal memory, select the correct filtering parameters, process/transfer data during filtering, and store the filtered pixels back to external and/or internal memory. Changes to a particular datapath of the control logic may require a redesign of the control logic, which typically must then be verified and/or validated prior to being implemented in a video coding device. In general, hardwired control logic for filtering processes reduces the re-usability of a particular implementation for multiple codecs and/or future codecs not yet developed.

Aspects of this disclosure include a unified programmable architecture for performing filtering operations. For example, according to aspects of this disclosure, video encoder 20 and/or video decoder 30 may filter pixel data during video coding, including determining a pixel filtering task from a plurality of pixel filtering tasks for filtering pixel data, where each filtering task of the plurality of pixel filtering tasks is based on an instruction set for a programmable instruction set based controller included in the video encoder 20 and/or video decoder 30. After determining the pixel filtering task, video encoder 20 and/or video decoder 30 executes the determined filtering task on the pixel data.

In an example, video encoder 20 and/or video decoder 30 may include an instruction set based controller having multiple task RAMs, with each of the task RAMs holding a task set (e.g., a sequence of instructions) specifically constructed for a particular codec. The task set may be built using the underlying instructions from an instruction set. For example, the instruction set may include FETCH, OPERATIONS (e.g., boundary strength, deblocking, or SAO specific operations) and/or SAVE commands. The number of task RAMs may be configured based on the throughput requirements video encoder 20 and/or video decoder 30.

According to aspects of this disclosure, the instruction set based controller included in video encoder 20 and/or video decoder 30 may be configured to determine a pixel filtering task from a plurality of pixel filtering operations including, for example, operations for pixel edge boundary strength generation, deblocking pixel filtering, SAO pixel statistics gathering, and SAO offset application. Video encoder 20 and/or video decoder 30 may determine the appropriate pixel filtering task according to the particular video coding process being executed (e.g., based on whether the video coding process includes operations for pixel edge boundary strength generation, deblocking pixel filtering, SAO pixel statistics gathering, and/or SAO offset application). In other examples, the programmable architecture may perform other filtering operations (e.g., pixel interpolation, sharpening, or the like). That is, as described herein, filtering operations performed using the instruction set based controller may include any combination of techniques associated with manipulating pixel data to remove or compensate for coding artifacts (e.g., reconstruction error).

As noted above, the techniques may be used with multiple codecs with minor changes to control logic. That is, the instruction set based controller may be adaptable for use with a variety of different video coding devices with a relatively small amount of reconfiguration for each particular application.

Figure 2:
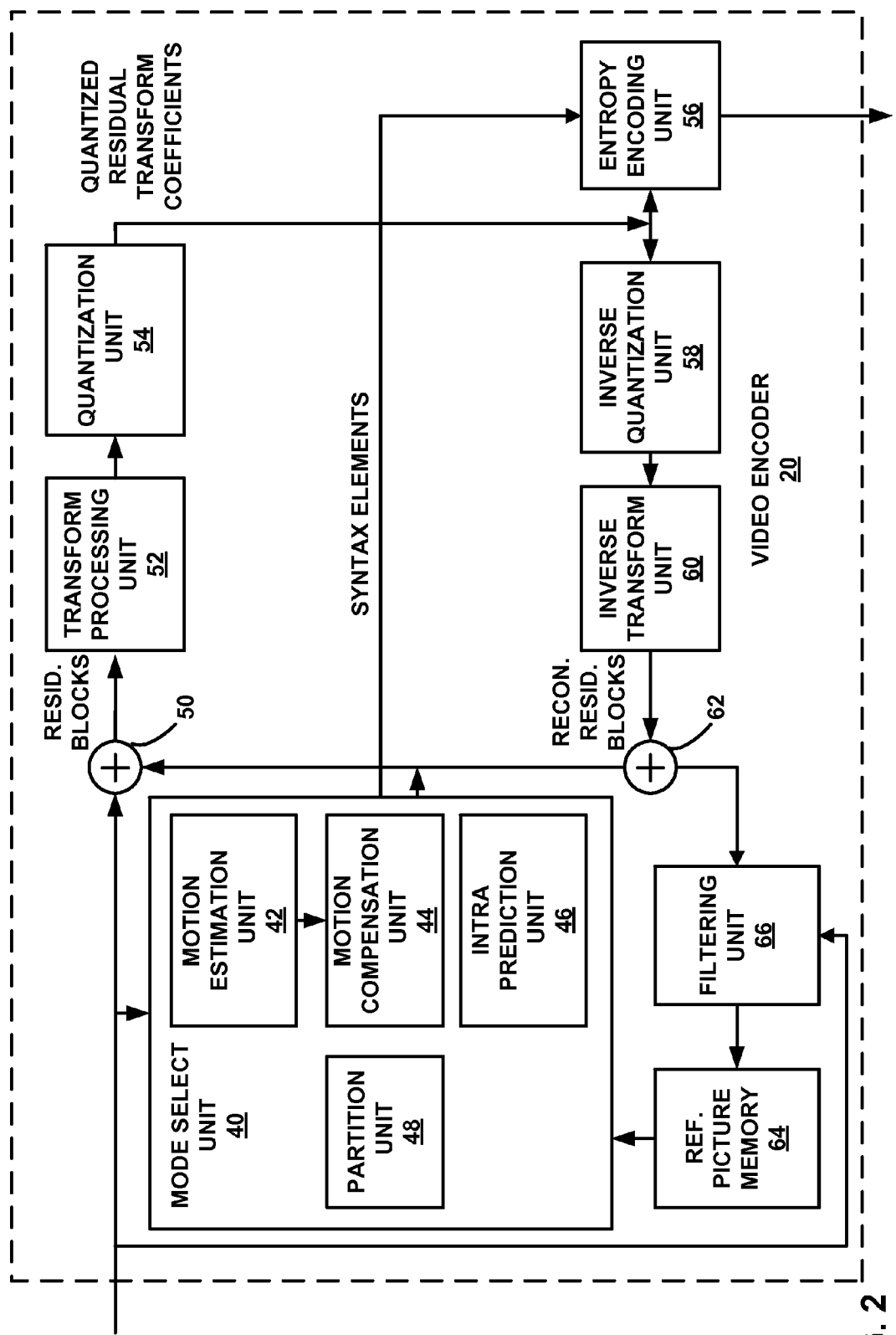
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards or methods that may require scanning of transform coefficients.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, summer 62, and filtering unit 66.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Filtering unit 66 may perform a variety of filtering processes. For example, filtering unit 66 may perform deblocking That is, filtering unit 66 may receive a plurality of reconstructed video blocks forming a slice or a picture of reconstructed video and filter block boundaries to remove blockiness artifacts from a slice or picture. In one example, filtering unit 66 evaluates the so-called "boundary strength" of a video block. Based on the boundary strength of a video block, edge pixels of a video block may be filtered with respect to edge pixels of an adjacent video block such that the transition from one video block are more difficult for a viewer to perceive.

In some instances, the variables used by a deblocking filter may be derived from reconstructed video blocks without a comparison of reconstructed video blocks to the original source video blocks. Thus, video encoder 20 and video decoder 30 (FIG. 3) may each be programmed to perform the same deblocking process on reconstructed video blocks with minimal additional information regarding the original video picture coded into the bitstream. However, in some cases, filtering unit 66 may include syntax elements in the bitstream to indicate whether deblocking should be performed and/or whether one of a particular type of deblocking modes should be performed.

Filtering unit 66 may also perform SAO and/or adaptive loop filtering (ALF). For example, filtering unit 66 may obtain reconstructed video blocks from a deblocking process (such as that described above) and may apply SAO and/or other filtering techniques to the reconstructed video blocks.

For example, SAO is an in-loop process that is performed post deblocking which has been adopted in the HEVC standard. SAO coding techniques may add offset values to pixels in a reconstructed video picture where the offset values are calculated based on the source video picture. Thus, filtering unit 66 may apply SAO to reduce the distortion between post deblocked and original pixels by adding an offset to the pixels.

The addition of offset values to pixels in a reconstructed picture may improve coding during illumination changes between pictures of a video sequence. Such illumination changes may add a relatively uniform intensity change across regions of pixels in the picture. Filtering unit 66 may apply offset values to pixels of a predicted video block in order to bias the values of the predictive video block so as to compensate for illumination changes.

Filtering unit 66 may determine and apply offset values to a pixel for SAO by classifying a pixel according to a classification metric. A classification metric may also be referred to as pixel classification or an offset type. Possible classification metrics include activity metrics such as edge metrics and band metrics. For example, filtering unit 66 may determine a pixel classification based on edge properties of the pixel (edge metric). In this example, filtering unit 66 may compare a pixel to six neighboring pixels to determine the edge offset for the pixel. In another example, filtering unit 66 may determine a pixel classification based on pixel intensities (band metric) to determine a band offset. Thus, the result of classifying a pixel according to a classification metric may also be referred to as an offset type, pixel offset type, category or pixel category.

Some video coding standards may limit the number of different pixel classifications that may be applied per picture (e.g., one technique per picture), while others may allow for more flexibility by allowing different pixel classifications to be applied on a block-by-block or pixel-by-pixel basis. The number of pixel classification types that are allowed to be applied, and the frequency at which different pixel classifications are allowed to be applied in a video picture, may affect coding efficiency.

As part of determining the offsets and SAO parameters, filtering unit 66 may first gather pixel statistics using post deblocked and original pixels for a current block. In the context of HEVC, filtering unit 66 may gather pixel statistics on a per-LCU basis.

Filtering unit 66 may, in some examples, perform a so-called sub-optimal approach to SAO filtering. For example, filtering unit 66 may discard one or more pixels in the current LCU if the filtering process is not meeting a predetermined cycle count budget. In another example, filtering unit 66 may use pre-deblocked pixels for one or more final rows and/or columns of pixels in current LCU for SAO. Filtering unit 66 may use the pre-deblocked pixels, due to the configuration of some processing pipeline implementations that do not perform deblocking of the final rows of current LCU, which may be instead stored to a line buffer. Such pixels may be deblocked later when the pipeline further processes neighboring blocks that do not rely on the LCU for reference data. Filtering unit 66 may also use a sub-optimal approach (including using pre-deblocked pixels for one or more rows and/or columns) in instances in which deblocking and SAO are performed in the same pipeline stage. In any case, following pixel statistics gathering, filtering unit 66 may perform a cost calculation algorithm to determine the optimal SAO parameters and the offsets for the LCU.

Filtered, reconstructed video blocks may be stored in the reference picture memory 64, which may also be referred to as a reference frame buffer or decoded picture buffer. The reconstructed video blocks may be used by the motion estimation unit 42 and the motion compensation unit 44 to generate reference blocks to inter-code a block in a subsequent video picture. While deblocking and SAO filtering are described for purposes of illustration, video encoder 20 (and filtering unit 66) may incorporate any number of other in-loop (e.g., at the output of summer 62) and/or post-loop filters.

According to aspects of this disclosure, filtering unit 66 may include an instruction set based controller for controlling pixel filtering. For example, filtering unit 66 may include and instruction set based controller for managing and performing a plurality of filtering operations, including, for example, the deblocking and SAO operations described above (as well as any other filtering operations performed by video encoder 20).

In some examples, filtering unit 66 may manage and/or perform each filtering process by executing a sequence of instructions, which may be referred to as a task set. Each task set may include one or more instructions from an instruction set for the instruction set based controller. As described in greater detail with respect to FIG. 4 and the example task sets of FIGS. 5A-5F, non-limiting example instructions of the instruction set include FETCH, OPERATIONS (e.g., boundary strength, deblocking, or SAO specific operations) and/or SAVE commands. Each task set may be assembled based on the particular filtering operation being performed, as well as the particular coding standard being adhered to (e.g., H.264, HEVC, or the like).

Filtering unit 66 may include memory (or may access allocated memory associated with another component of video encoder 20) for task set storage. For example, filtering unit 66 may store each sequence of instructions associated with a task set to a particular memory. The number and/or size of the memory allocated to store task sets may be based on the throughput requirements filtering unit 66 and video encoder 20.

In this manner, video encoder 20 represents an example of a video encoder that may determine a pixel filtering task from a plurality of pixel filtering tasks for filtering the pixel data, where each filtering task of the plurality of pixel filtering tasks is based on an instruction set for a programmable instruction set based controller, and execute the determined filtering task on the pixel data.

Figure 3:
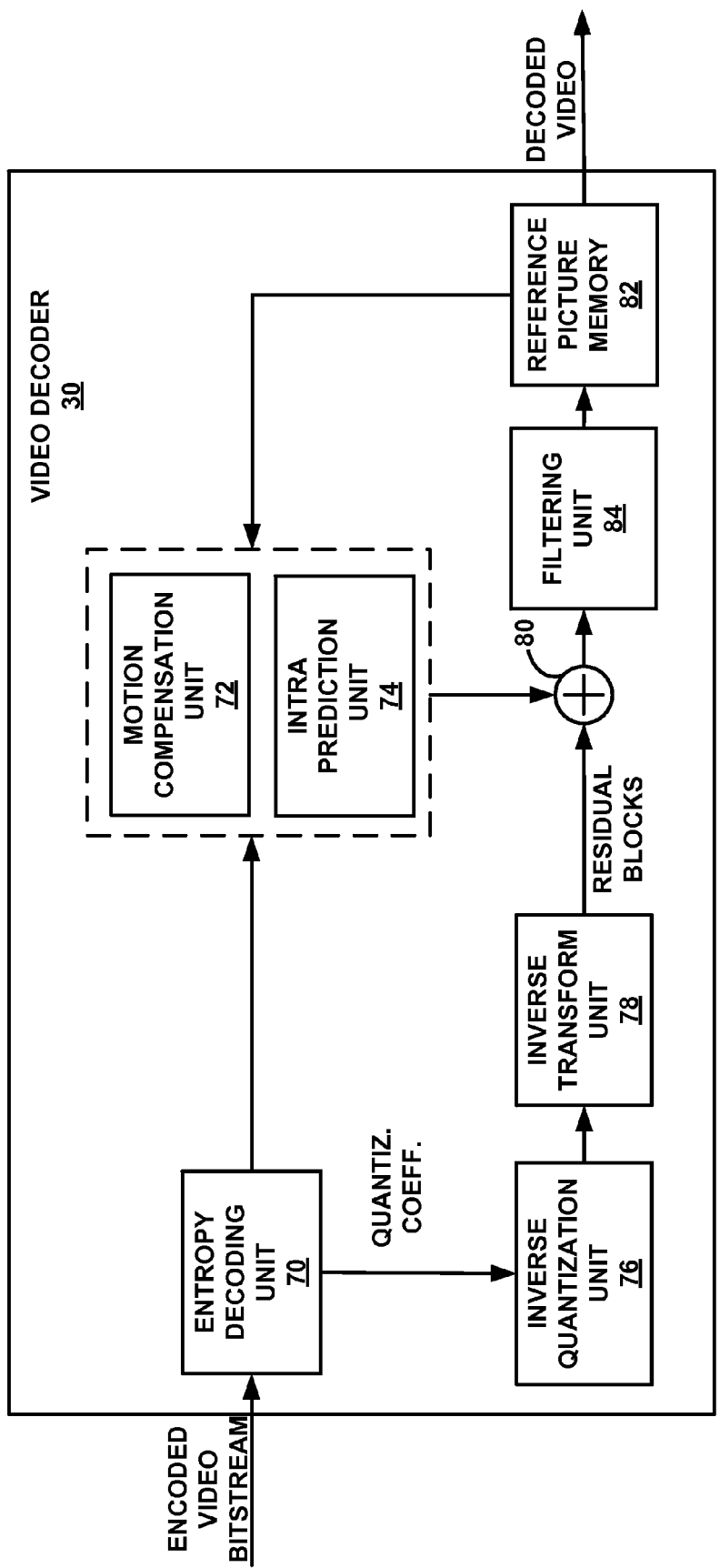
FIG. 3 is a block diagram illustrating an example video decoder that may implement the techniques of this disclosure.

FIG. 3 is a block diagram illustrating an example of video decoder 30 that may implement techniques for transformation as described in this disclosure. In the example of FIG. 3, video decoder 30 includes an entropy decoding unit 70, motion compensation unit 72, intra prediction unit 74, inverse quantization unit 76, inverse transformation unit 78, reference picture memory 82, summer 80, and filtering unit 84.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform unit 78 with the corresponding predictive blocks generated by motion compensation unit 72. Summer 80 represents the component or components that perform this summation operation.

Filtering unit 84 may, in some examples, be configured similarly to filtering unit 66 of video encoder 20 (FIG. 2). For example, filtering unit 84 may be configured to perform deblocking, SAO, or other filtering operations when decoding and reconstructing video data from an encoded bitstream.

In an example, filtering unit 84 may receive a plurality of reconstructed video blocks forming a slice or a picture of reconstructed video and filter block boundaries to remove blockiness artifacts from a slice or picture. Filtering unit 84 may evaluate the boundary strength of a video block and filter edge pixels with respect to edge pixels of an adjacent video block, such that the transition from one video block to another is more difficult for a viewer to perceive. In some examples, filtering unit 84 may be programmed to perform the same deblocking process on reconstructed video blocks as filtering unit 66 (FIG. 2) with minimal additional information regarding the original video picture coded into the bitstream. In other examples, filtering unit 84 may obtain syntax elements from an encoded bitstream and use the syntax elements to control the manner in which a picture is deblocked.

Filtering unit 84 may also perform SAO and/or adaptive loop filtering (ALF). For example, filtering unit 84 may obtain reconstructed video blocks from a deblocking process (such as that described above) and may apply SAO and/or other filtering techniques to the reconstructed video blocks. Filtering unit 84 may determine SAO parameters and offsets based on information included in the bitstream. Filtering unit 84 may classify pixels based on edge values and/or intensity values based on such information. Filtering unit 84 may then apply the determined offsets to the pixels. Thus, offset application may be carried out in both encode and decode mode, while pixel statistics gathering may only be carried out by video encoder 20.

According to aspects of this disclosure, filtering unit 84 may include an instruction set based controller for controlling pixel filtering. For example, filtering unit 84 may include an instruction set based controller for managing and performing a plurality of filtering operations, including, for example, the deblocking and SAO operations described above (as well as any other filtering operations performed by video decoder 30).

In some examples, filtering unit 84 may manage and/or perform each filtering process by executing a sequence of instructions, which may be referred to as a task set. Each task set may include one or more instructions from an instruction set for the instruction set based controller. As described in greater detail with respect to FIG. 4 and the example task sets of FIGS. 5A-5F, non-limiting example instructions of the instruction set include FETCH, OPERATIONS (e.g., boundary strength, deblocking, or SAO specific operations) and/or SAVE commands. Each task set may be assembled based on the particular filtering operation being performed, as well as the particular coding standard being adhered to (e.g., H.264, HEVC, or the like).

Filtering unit 84 may include memory (or may access allocated memory associated with another component of video decoder 30) for task set storage. For example, filtering unit 84 may store each sequence of instructions associated with a task set to a particular memory. The number and/or size of the memory allocated to store task sets may be based on the throughput requirements of filtering unit 84 and video decoder 30.

The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder that may determine a pixel filtering task from a plurality of pixel filtering tasks for filtering the pixel data, where each filtering task of the plurality of pixel filtering tasks is based on an instruction set for a programmable instruction set based controller, and execute the determined filtering task on the pixel data.

Figure 4:
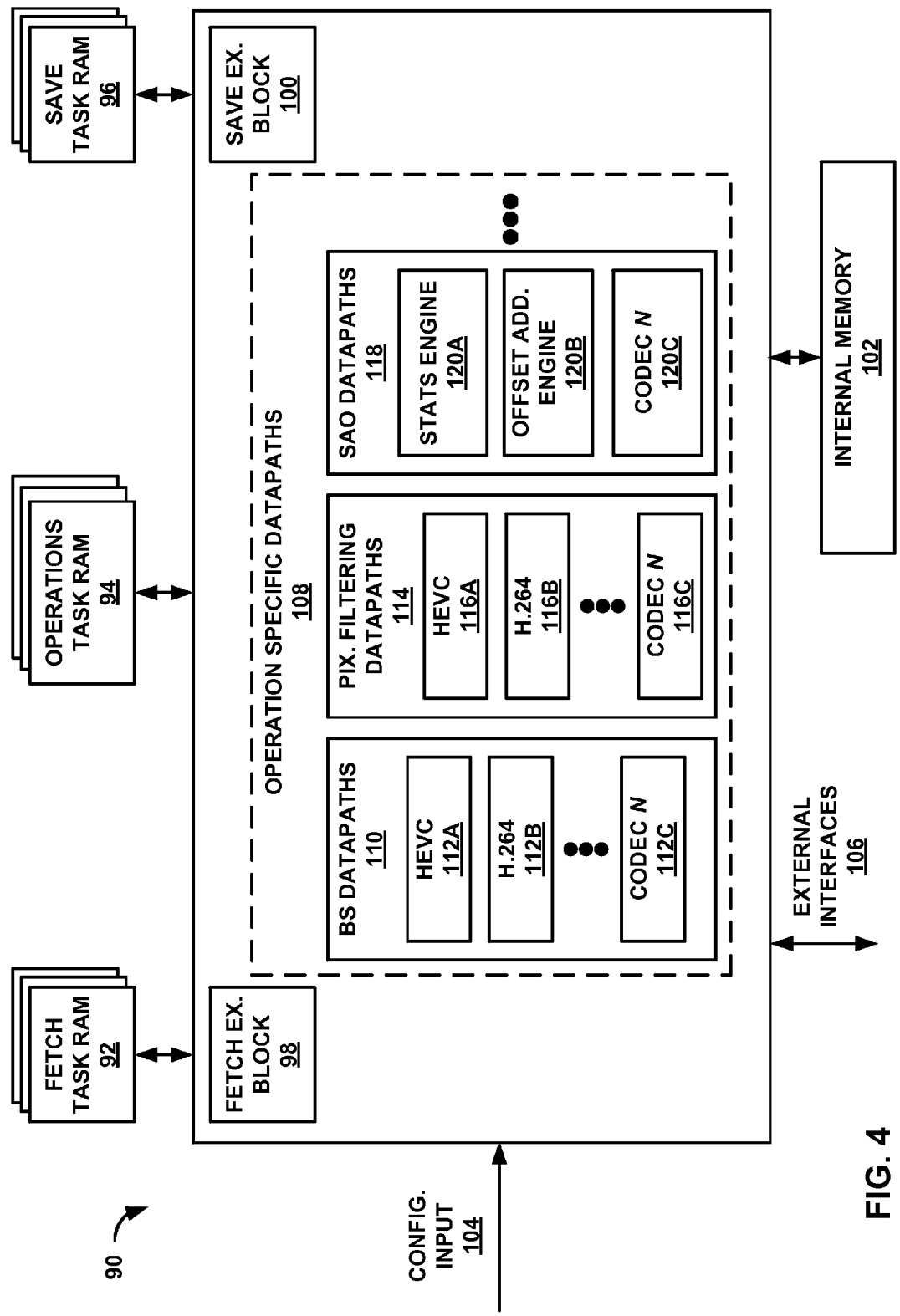
FIG. 4 is a block diagram of an instruction set based controller for controlling pixel filtering, according to aspects of this disclosure.

FIG. 4 is a block diagram of an instruction set based controller for controlling pixel filtering, according to aspects of this disclosure. In some examples, the instruction set based controller ("controller") 90 shown in the example of FIG. 4 may be incorporated in video encoder 20 and/or video decoder 30 (e.g., form at least a portion of filtering unit 66 and/or filtering unit 84, respectively). In other examples, controller 90 may be incorporated into a variety of other video coding devices or processors.

In the example of FIG. 4, controller 90 includes a fetch task RAM 92, an operations task RAM 94, and a save task RAM 96, which may be separate memory devices or allocated portions of the same memory device. Controller 90 also includes a fetch execution block 98, a save execution block 100, and an internal memory 102. In addition, controller 90 may be configured to receive configuration information via configuration input 104, and may communicate with one or more other devices (or other units a video coder) using external interfaces 106. Controller 90 also includes operation specific datapaths 108.

Fetch task RAM 92, operations task RAM 94, and save task RAM 96 may include allocated memory for storing instructions that are executed by controller 90. For example, fetch task RAM 92 may store at least a portion of one or more task sets (e.g., a sequence of one or more instructions from an instruction set of controller 90) for fetching data for execution. Operations task RAM 94 may store at least a portion of one or more task sets for performing filtering operations. Save task RAM 96 may store at least a portion of one or more task sets for saving filtered data.

For example, instructions of an instruction set for controller 90 that may be stored to fetch task RAM 92, operations task RAM 94, and save task RAM 96 include FETCH, OPERATIONS, and SAVE commands, respectively.

In this example, a FETCH command may be capable of fetching pixel and non-pixel data (e.g., motion vectors, quantization parameters, SAO parameters, and the like) from external memory and storing the data to controller 90. For example, a FETCH command may specify the required external source from where the data needs to be fetched (such as one or more other components of video encoder 20 or video decoder 30), the parameters needed to drive external interfaces 106, and the storage location of controller 90 to which fetched data is stored (such as a location of internal memory 102). In some examples, a FETCH command may also specify a particular OPERATIONS command (e.g., boundary strength, deblocking, SAO, or the like) or SAVE command in an OPERATIONS or SAVE task set that needs to be completed prior to executing a current FETCH command. When branching is performed, a FETCH command may specify the branch location within its task set to which the execution jumps (e.g., forward or backward), along with a status bit for conditional branching (or the branch location only, in the case of un-conditional branching).

In the example above, the OPERATIONS command may be executed to carry out boundary strength generation, deblocking, SAO, or other filtering processes. The OPERATIONS command may be tailored to a particular type of filtering process, e.g., boundary strength generation, deblocking, SAO, or the like. The OPERATIONS command may specify the input pixels to be operated on, as well as parameters for an operations specific datapath 108 for a particular codec. Input data for the OPERATIONS command may be specified in internal memory 102 (previously fetched) or provided explicitly as part of the instruction. In some examples, an OPERATIONS command may also specify a particular FETCH, OPERATIONS (e.g., boundary strength, deblocking, SAO, or the like) or SAVE command in a FETCH or SAVE task set that needs to be completed prior to executing a current OPERATIONS command. When branching is performed, an OPERATIONS command may specify the branch location within its task set to which the execution jumps (e.g., forward or backward), along with a status bit for conditional branching (or the branch location only, in the case of un-conditional branching).

In the example above, the SAVE command may be executed to write data (both pixel and non-pixel data) from internal memory 102 to memory that is external to controller 90 via external interfaces 106. For example, the SAVE command may specify the internal register block of internal memory 102 from which data is to be read from, the parameters needed to drive external interfaces 106, and the external destination to which data is stored. The SAVE command may also specify a particular FETCH, OPERATIONS (e.g., boundary strength, deblocking, SAO, or the like) or SAVE command in an FETCH or OPERATIONS task set that needs to be completed prior to executing a current SAVE command. When branching is performed, a SAVE command may specify the branch location within its task set to which the execution jumps (e.g., forward or backward), along with a status bit for conditional branching (or the branch location only, in the case of un-conditional branching).

It should be understood that the FETCH, OPERATIONS, and SAVE instructions described above are provided for purposes of example only. In other examples, other instructions may be stored to fetch task RAM 92, operations task RAM 94, and save task RAM 96 for carrying out pixel filtering operations.

Fetch execution block 98 and save execution block 100 may fetch commands from fetch task RAM 92, operations task RAM 94, and save task RAM 96 and may execute such commands. After fetch execution block 98 and/or save execution block 100 fetches and executes a current set of commands, fetch execution block 98 and/or save execution block 100 may fetch new commands from fetch task RAM 92, operations task RAM 94, and save task RAM 96 until all task sets have been executed.

As shown in the example of FIG. 4, according to aspects of this disclosure, fetch execution block 98 and save execution block 100 are common for all video coding standards supported by controller 90. For example, datapaths for fetch execution block 98 and save execution block 100 do not vary based on the video coding standard being conformed to by controller 90. In this example, controller 90 requires only a relatively small amount of codec-specific datapaths/logic (e.g., such as operation specific datapaths 108).

Accordingly, when fetching pixel data from internal memory 102 (or an external memory via external interfaces 106) controller 90 uses the same fetch logic (of fetch execution block 98) regardless of the coding standard being implemented, which may increase efficiency and reduce chip space requirements when compared to a controller having separate datapaths for each video coding standard. Moreover, when storing data to internal memory 102 (or an external memory via external interfaces 106) controller 90 uses the same save logic (of save execution block 100) regardless of the coding standard being implemented, thereby providing similar efficiency and/or space gains.

Internal memory 102 may store pixel data (e.g., luma and/or chroma values) and non-pixel data (e.g., motion vectors, quantization parameters, SAO parameters, or the like) that is operated on by controller 90. That is, internal memory 102 may be a working memory for controller 90, such that data used during filtering operations performed by controller 90 is stored to internal memory 102.

Configuration input 104 may be used to receive relevant motion vectors, quantization parameters, or other data that is operated on by controller 90. In some examples, configuration input 104 may also receive instructions for configuring datapaths 108. For example, configuration information received via configuration input 104 may include instructions for configuring SAO datapaths 118 to perform a sub-optimal solution in which fewer than all pixels are filtered. Configuration information may also be used to control the manner in which fetch execution block 98, save execution block 100, or other components of controller 90 operate.

External interfaces 106 may allow controller 90 to communicate with one or more external memories for pixel and non-pixel data. Such pixel and non-pixel data may include, for example, motion vectors, quantization parameters, pre-deblocked pixels, post-deblocked pixels (e.g., prior to SAO), original YUV pixels, and post-SAO pixels, or other data.

In the example shown in FIG. 4, operation specific datapaths 108 include boundary strength datapaths 110, including HEVC specific datapaths 112A, H.264 specific datapaths 112B, and one or more additional datapaths (codec N) 112C for other codecs, i.e., codecs different from HEVC or H.264 codecs. Operation specific datapaths 108 also include pixel filtering datapaths 114, including HEVC specific datapaths 116A, H.264 specific datapaths 116B, and one or more additional datapaths (codec N) 116C for other codecs, i.e., codecs different from HEVC or H.264 codecs. Operation specific datapaths 108 also include SAO datapaths 118, including statistics engine 120A and offset addition engine 120B for performing HEVC SAO operations. In another example, SAO datapaths 118 may include datapaths for other codecs (codec N) 120C.

In general, controller 90 may use datapaths 108 to perform filtering processes. For example, in the example of FIG. 4, datapaths 108 may perform pixel edge boundary strength generation, deblocking pixel filtering, SAO pixel statistics gathering and SAO offset application.

In an example for purposes of illustration, with respect to boundary strength datapaths 110, fetch execution block 98 may execute a FETCH command to retrieve relevant motion vectors, quantization parameters, or other data via configuration input 104 or external interfaces 106. Controller 90 may store the fetched data to internal memory 102. Controller 90 may then use boundary strength (BS) datapaths 110 to carry out boundary strength generation calculations using the data stored to internal memory 102, data received from configuration input 104, or from parameters specified in one or more OPERATIONS instruction fields. Controller 90 may select a codec specific datapath, such as one of HEVC specific datapaths 112A, H.264 specific datapaths 112B, or datapaths of another codec (codec N) 112C to perform the boundary strength generation calculations. That is, controller 90 may select a codec specific datapath based on the format of the data being operated on, which may be specified by information received via configuration input 104. The selected boundary strength datapaths 110 may store the generated boundary strength values to internal memory 102.

Thus, in the example of FIG. 4, boundary strength generation operations may be scalable across codecs, e.g., the same hardware may be used to support current or future codecs by loading (e.g., downloading) the appropriate task instruction set (e.g., a task RAM image) into the operations task RAM 94, along with adding a new datapath to the boundary strength datapaths 110. Such information may be received via configuration input 104.

In another example, with respect to pixel filtering datapaths 114, fetch execution block 98 may execute a FETCH command to retrieve relevant pre-deblocked pixel data via configuration input 104 or external interfaces 106. Controller 90 may store the fetched data to internal memory 102 is retrieved and stored from the internal storage blocks. In addition, controller 90 may read deblocking parameters for carrying out deblocking operations from configuration input 104, internal memory 102, or from OPERATIONS instruction fields. Controller 90 may select a codec specific datapath, such as one of HEVC specific datapaths 116A, H.264 specific datapaths 116B, or datapaths of another codec (codec N) 116C to perform deblocking filtering. That is, controller 90 may select a codec specific datapath based on the format of the data being operated on, which may be specified by information received via configuration input 104. The selected pixel filtering datapaths 114 may store the deblocked pixels to internal memory 102.

Thus, controller 90 provides relatively easy configurability of a deblocking order across multiple codecs. That is, controller 90 may be adaptable to support different datapath implementations, e.g., LCU- or CU-based processing in HEVC. Pixel filtering datapaths 114 may also differ on the number of pixel lines the datapaths filter in parallel. In this way, controller 90 provides scalability across codecs, e.g., the same hardware may be used to support current or future codecs by loading (e.g., downloading) the appropriate task instruction set (e.g., a task RAM image) into the operations task RAM 94, along with adding a new datapath to the pixel filtering datapaths 114.

In another example, with respect to SAO datapaths 118, for SAO statistics gathering, fetch execution block 98 may execute a FETCH command to retrieve relevant original pixels, as well as deblocked pixels/pre-deblocked pixels/post-vertical edge deblocked pixels (for suboptimal approaches) from internal memory 102. Statistics engine 120A may then perform statistics gathering operations and store the pixel statistics to internal memory 102.

Thus, the instruction set based controller 90 control allows relatively easy configurability of a pixel statistics engine, such as statistics engine 120A ("stats engine"). For example, controller 90 provides a manner in which to control the pixels that are sent to SAO statistics engine 120A and SAO offset addition engine 120B ("offset add. engine"). Accordingly, datapaths with different pixel processing capabilities may use the same controller 90 with a modified task set, rather than requiring changes in hardwired logic. In this way, controller 90 provides scalability across codecs, e.g., the same hardware may be used to support current or future codecs by loading (e.g., downloading) the appropriate task instruction set (e.g., a task RAM image) into the operations task RAM 94, along with adding a new datapath to the SAO datapaths 118.

As another example, fetch execution block 98 may also execute a FETCH command to retrieve relevant deblocked pixel data from internal memory 102 for SAO offset application, as well as SAO parameters and offsets required to carry out offset addition from control registers, internal memory 102 or OPERATIONS instruction fields. Offset addition engine 120B may then carry out offset addition on pixels. Offset addition engine 120B may store the post-SAO pixels to internal memory 102.

Thus, controller 90 may also be more adaptable to different pipeline implementations. For example, controller 90 may perform deblocking (e.g., using pixel filtering datapaths 114) in the same or a different pipe as SAO operations by controlling the pixels sent to the datapaths though a task set that is stored to task RAMs 92-96, rather than using hardwired logic. Controller 90 also allows configurability of SAO operations, e.g., to perform sub-optimal operations including less than all of the pixels in a picture, by loading a task instruction set (e.g., a task RAM image) into the operations task RAM 94. As noted above, controller 90 may also be adapted to perform SAO operations in future codecs (represented by codec N 120C) with few or no changes to control logic of controller 90.

Datapaths 108 are provided merely as an example, and any number of other datapaths 108 may be included in controller 90 for performing additional filtering processes. In addition, as noted above, datapaths 108 may include separate datapaths for a number of different coding standards. While H.264 and HEVC are illustrated for purposes of example, in other examples, datapaths 108 may include defined datapaths for other current standards or standards not yet developed.

Thus, FIG. 4 illustrates and example of a unified programmable architecture for performing a variety of filtering processes. As noted above, the architecture has the potential to be used for multiple codecs with few or no changes to hardware-based control logic of controller 90. Moreover, the programmable nature of controller 90 may ease the verification processes carried out to verify proper operation of filtering processes during a design phase. For example, debugging may be performed in a design environment without extensive changes to hardware, which may typically be more time consuming and/or expensive to change than software.

FIGS. 5A to 5F illustrate a plurality of example task sets, with each example task set including instructions for filtering video data. In some examples, the task sets shown in FIGS. 5A-5F may be executed by controller 90 (FIG. 4). That is, for example, the instructions of the task sets shown in FIGS. 5A-5F may be stored to task RAMs 92-96 and executed by controller 90. While described as being executed by controller 90 for purposes of explanation, it should be understood that the task sets shown in FIGS. 5A-5F may be executed by a variety of other controllers and/or processors having a variety of configurations.

FIG. 5A illustrates an example boundary strength task set for performing boundary strength calculations according to the HEVC video coding standard. As noted above, a video coder (such as video encoder 20 or video decoder 30) may perform boundary strength calculations to control the manner in which pixel filters (such as a deblocking filter) are configured or selected.

In the example of FIG. 5A, controller 90 may load instructions (Op Code) to task RAMs. The Fetch instruction may be used to fetch pixel data from external memory for use in the boundary strength calculation. The boundary strength calculation instruction (BS_Cal) may be used to carry out the boundary strength calculation. The save instruction (Save) may be used to store the result of the boundary strength calculation to memory.

In the example of FIG. 5A, parameter 1 (Param 1), parameter 2 (Param 2) and parameter 3 (Param 3) specify parameters for the boundary strength calculations. For example, Param 1 and Param 2 specify memory locations for data associated with the boundary strength calculations (BS_Cal) and Param 3 specifies the datapath of controller 90 for executing the boundary strength calculation. For example, Param 3 specifies HEVC boundary strength datapaths 112A shown in FIG. 4.

FIG. 5B illustrates an example boundary strength task set for performing boundary strength calculations according the H.264 video coding standard. The example of FIG. 5B includes similar instructions to those shown in FIG. 5A. However, Param 3 of FIG. 5B specifies that H.264 datapaths are to be used to carry out boundary strength calculations (BS_Cal). Thus, as shown in the examples of FIGS. 5A and 5B, controller 90 may execute instructions for performing both HEVC pixel filtering operations and H.264 pixel filtering operations without requiring separate sets of hardware logic for intake and control of the filtering operations. For example, while separate operations datapaths may be used to carry out standard specific operations (such as boundary strength calculations (BS_Cal)), as described above with respect to FIG. 4, logic associated with fetching and storing data may be common for all video coding standards.

FIG. 5C illustrates an example fetch task set. As noted above, a fetch instruction may be used to fetch pixel data and non-pixel data (e.g., motion vectors, quantization parameters, SAO parameters, and the like) from external memory. In the example, of FIG. 5C, instructions of the fetch task set include an Instruction Count parameter, an Opcode parameter, a Branch_EN parameter, a Wait_On/Branch Status parameter, a Source/Branch Address parameter, a Source_Address parameter, a Destination parameter, and a Param_N parameter.

The Instruction Count parameter indicates the general order of instructions in the instruction set. The Opcode parameter indicates the type of operation being performed by the task set. The Branch_EN parameter indicates whether any branching occurs within the task set. For example, in some instances, a fetch instruction can branch to any other location, thereby allowing branching from one task set to another. Thus, the Branch_EN parameter specifies a branching location.

The Wait_On/Branch Status parameter indicates whether a particular task is dependent on another task. For example, the Wait_On/Branch Status parameter may be used to synchronize the execution of one or more instructions and ensure that the data required for a particular operation to be executed is located in the appropriate memory location. The Source/Branch Address parameter may specify the source of data in internal memory, while the Destination parameter may specify the location to which data is stored in internal or external memory. Param_N represents other parameters that may be added to the instructions to accommodate different filtering processes and/or video coding standards.

FIG. 5D illustrates an example deblocking task set. The example of FIG. 5D includes an Instruction Count parameter, an Instruction parameter, a Branch parameter, and Wait_On/Branch Status parameter, which may be similar to those parameters of the example of FIG. 5C. In addition, the instructions of the deblocking task set specify the location of the block(s) being deblocked in memory (Left and Right), an indication of the blocks being operated on (IndecB, IndexTc), and an indication of the edge being processed (BS). Again, Param_N represents other parameters that may be added to the instructions to accommodate different filtering processes and/or video coding standards.

FIG. 5E illustrates an example save task set for an SAO operation. The example of FIG. 5E also includes Instruction Count, Instruction, Branch, and Wait_On/Branch Status, Source/Branch Address, and Destination parameters similar to those as included in the example instructions of FIG. 5C. In addition, the instructions of the save task set include a Destination_Address parameter that indicates a memory location of an internal or external memory (as specified by the destination parameter) to which data is saved. Again, param_N represents other parameters that may be added to the instructions to accommodate different filtering processes and/or video coding standards.

FIG. 5F illustrates an example SAO task set. The example of FIG. 5F includes Instruction Count, Instruction, Branch, and Wait_On/Branch Status parameters similar to those as those described above with respect to FIG. 5C. In addition, the instructions of the SAO task set include parameters for performing SAO operations. For example, the instructions also include an indication of the location of the pixels being operated on (Left Pixels, Right Pixels, Top_Pixels, Curr_Pixels, and Bottom_Pixels), as well as whether the original pixels are being used in the operation (Orig. Pixels). In addition, the instructions include an indication of the size/type of block used for SAO operations (SAO_PARAMS), which may indicate whether SAO is being performed on an LCU, a CU, or the like. Again, Param_N represents other parameters that may be added to the instructions to accommodate different filtering processes and/or video coding standards.

Thus, the example task sets of FIGS. 5A-5F illustrate task sets that may be used by an instruction set based controller (such as controller 90) may use to control pixel filtering operations in a video coding process. It should be understood that the task sets shown in FIG. 5A-FIG. 5F are provided for purposes of example only. That is, the task sets shown in FIG. 5A-FIG. 5F may be extended to be used with a variety of different video codecs.

Figure 6:
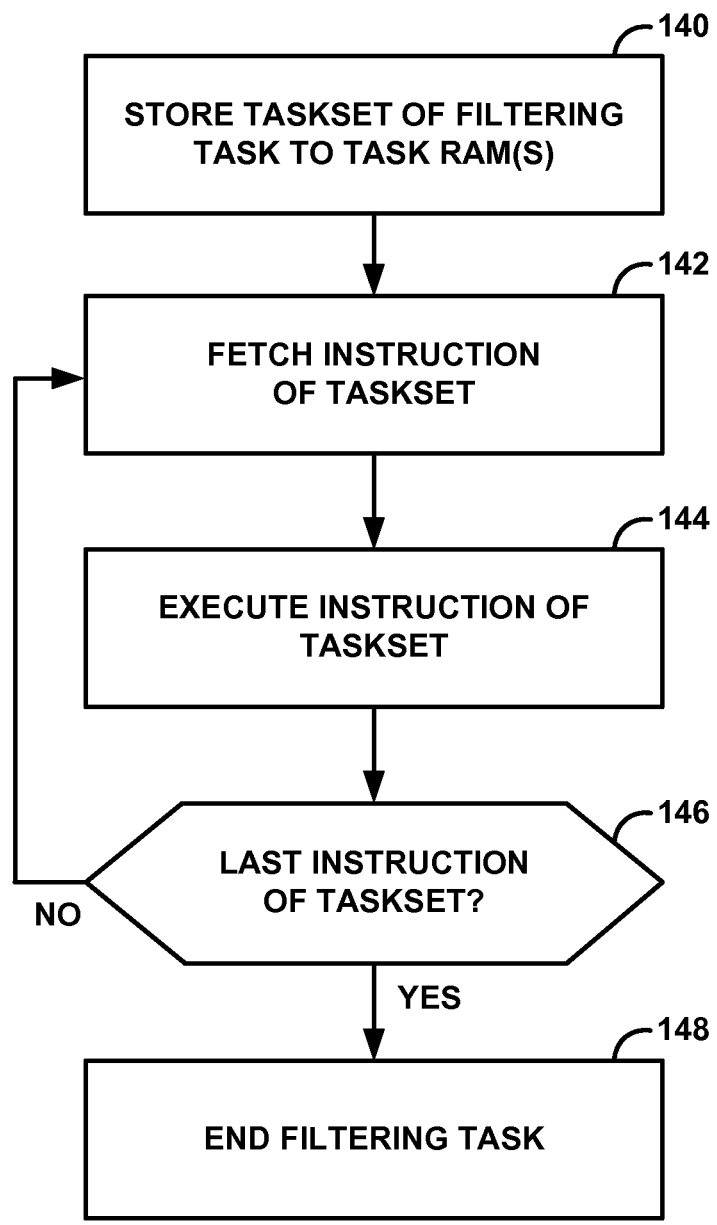
FIG. 6 is a flow diagram illustrating an example process for filtering video data in a video coding process, according to the techniques of this disclosure.

FIG. 6 is a flow diagram illustrating an example process for filtering video data in a video coding process, according to the techniques of this disclosure. The example shown in FIG. 6 is generally described as being performed by controller 90 (FIG. 4), which may be incorporated in video encoder 20 and/or video decoder 30. It should be understood that, in some examples, the process of FIG. 6 may be carried out by a variety of other processors.

In the example of FIG. 6, controller 90 may store a task set of a filtering task to one or more task RAMs (140). For example, controller 90 may fetch a particular task set for performing a predefined filtering operation. That is, to perform deblocking for a particular video coding standard, controller 90 may select the appropriate task set from a plurality of task sets associated with a plurality of tasks. Controller 90 may store instructions of the selected task set to task RAMs, such as fetch task RAM 92, operations task RAM 94, and save task RAM 96, for execution.

Controller 90 may then fetch an instruction from the task set for execution (142). For example, as noted above, fetch execution block 98, save execution block 100, or another component of controller 90 may retrieve an instruction from the appropriate task RAM.

Controller 90 may then execute the fetched instruction of the task set (144). For example, as described with respect to FIG. 4 above, fetch execution block 98, save execution block 100, or another component of controller 90 may execute a FETCH command, an OPERATIONS command, or a SAVE command to control the manner in which a plurality of filtering processes are performed. That is, the instructions that are executed by controller 90 may be used to transfer data to the appropriate location in memory, initiate one or more filtering operations (e.g., as performed by one of a plurality of datapaths), transfer data to external memory, or the like.

Controller 90 also determines whether the executed instruction is the final (i.e., last) instruction of the task set (146). If the instruction is the final instruction of the task set, controller 90 may end the filtering task (and may begin a new filtering task by loading a new task set). If the instruction is not the final instruction of the task set, controller 90 may return to step 142 and fetch the next instruction of the task set.

In this way, controller 90 provides a flexible architecture for performing a plurality of filtering tasks. That is, controller 90 may be configured to perform a particular set of filtering tasks, e.g., associated with a particular video coding standard, with little or no change to underlying hardware.

Certain aspects of this disclosure have been described with respect to the developing HEVC standard for purposes of illustration. However, the techniques described in this disclosure may be useful for other video coding processes, such as those defined according to H.264 or other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering pixel data in video coding, the method comprising:
    determining a pixel filtering task from a plurality of pixel filtering tasks for filtering the pixel data, wherein each filtering task of the plurality of pixel filtering tasks is based on an instruction set for a programmable instruction set based controller;
    selecting a datapath to perform the determined pixel filtering task from a plurality of datapaths defined for the pixel filtering task; and
    executing the determined pixel filtering task on the pixel data using the selected datapath.

2. The method of claim 1, further comprising determining a video coding standard of a plurality of video coding standards associated with the determined pixel filtering task based on an instruction of the instruction set, wherein selecting the datapath comprises selecting the datapath from the plurality of datapaths based on the determined video coding standard.

3. The method of claim 2, wherein executing the determined pixel filtering task for the determined video coding standard comprises fetching the pixel data from a memory using fetch logic that is common for the plurality of video coding standards and saving processed pixel data to the memory using save logic that is common for the plurality of video coding standards.

4. The method of claim 1, wherein the plurality of filtering tasks include more than one of edge boundary strength operations, deblocking pixel filtering, sample adaptive offset (SAO) pixel statistics gathering, and SAO offset application.

5. The method of claim 1, wherein determining the pixel filtering task comprises determining a task set for the pixel filtering task, wherein the task set includes a sequence of commands of the instruction set for the instruction set based controller.

6. The method of claim 5, wherein the instruction set comprises a plurality of FETCH instructions for retrieving the pixel data from a memory, a plurality of OPERATIONS instructions for performing one or more pixel filtering operations on the pixel data, and a plurality of SAVE instructions for storing the pixel data to the memory.

7. The method of claim 1, wherein the datapath comprises a first datapath, the plurality of datapaths comprises a first plurality of datapaths, and wherein the method further comprises:
    branching from the determined filtering task to a second filtering task;
    selecting a second datapath to perform the determined pixel filtering task from a plurality of second datapaths that are separate from the first plurality of datapaths; and
    executing the second filtering task using the second datapath.

8. The method of claim 1, further comprising transferring the pixel data from an external memory to an internal memory prior to executing the determined filtering task.

9. The method of claim 8, wherein transferring the pixel data comprises storing at least one of one or more motion vectors, one or more quantization parameters, pixel data prior to deblocking, pixel data prior to SAO, pixel data post deblocking, and pixel data post SAO operations.

10. An apparatus for filtering pixel data in video coding, the apparatus comprising:
a memory configured to store the pixel data; and
one or more processors configured to:
determine a pixel filtering task from a plurality of pixel filtering tasks for filtering the pixel data, wherein each filtering task of the plurality of pixel filtering tasks is based on an instruction set for the one or more processors; and
select a datapath to perform the determined pixel filtering task from a plurality of datapaths defined for the pixel filtering task;
execute the determined pixel filtering task on the pixel data using the selected datapath.

11. The apparatus of claim 10, wherein the one or more processors are further configured to determine a video coding standard of a plurality of video coding standards associated with the determined pixel filtering task based on an instruction of the instruction set, and wherein to select the datapath, the one or more processors are configured to select the datapath from the plurality of datapaths based on the determined video coding standard.

12. The apparatus of claim 11, further comprising:
fetch logic configured to retrieve the pixel data from a memory, wherein the fetch logic is common for the plurality of video coding standards;
save logic configured to store the pixel data to the memory, wherein the save logic is common for the plurality of video coding standards; and
wherein to execute the determined pixel filtering task for the determined video coding standard, the one or more processors are configured to fetch the pixel data using the fetch logic and save processed pixel data using the save logic.

13. The apparatus of claim 10, wherein the plurality of filtering tasks include more than one of edge boundary strength operations, deblocking pixel filtering, sample adaptive offset (SAO) pixel statistics gathering, and SAO offset application.

14. The apparatus of claim 10, wherein to determine the pixel filtering task, the one or more processors are configured to determine a task set for the pixel filtering task, wherein the task set includes a sequence of commands of the instruction set.

15. The apparatus of claim 14, wherein the instruction set comprises a plurality of FETCH instructions for retrieving the pixel data from a memory, a plurality of OPERATIONS instructions for performing one or more pixel filtering operations on the pixel data, and a plurality of SAVE instructions for storing the pixel data to the memory.

16. The apparatus of claim 10, wherein the datapath comprises a first datapath, the plurality of datapaths comprises a first plurality of datapaths, and wherein the one or more processors are further configured to:
branch from the determined filtering task to a second filtering task;
select a second datapath to perform the determined pixel filtering task from a plurality of second datapaths that are separate from the first plurality of datapaths; and
execute the second filtering task using the second datapath.

17. The apparatus of claim 10, wherein the one or more processors are further configured to transfer the pixel data from an external memory to an internal memory prior to executing the determined filtering task.

18. The apparatus of claim 17, wherein to transfer the pixel data, the one or more processors are configured to store at least one of one or more motion vectors, one or more quantization parameters, pixel data prior to deblocking, pixel data prior to SAO, pixel data post deblocking, and pixel data post SAO operations.

19. An apparatus for filtering pixel data in video coding, the apparatus comprising:
means for determining a pixel filtering task from a plurality of pixel filtering tasks for filtering the pixel data, wherein each filtering task of the plurality of pixel filtering tasks is based on an instruction set for a programmable instruction set based controller;
means for selecting a datapath to perform the determined pixel filtering task from a plurality of datapaths defined for the pixel filtering task; and
means for executing the determined pixel filtering task on the pixel data using the selected datapath.

20. The apparatus of claim 19, further comprising means for determining a video coding standard of a plurality of video coding standards associated with the determined pixel filtering task based on an instruction of the instruction set, and wherein the means for selecting the datapath comprises means for selecting the datapath from the plurality of datapaths based on the determined video coding standard.

21. The apparatus of claim 20, wherein the means for executing the determined pixel filtering task for the determined video coding standard comprises means for fetching the pixel data from a memory that is common for the plurality of video coding standards and means for saving processed pixel data to the memory that is common for the plurality of video coding standards.

22. The apparatus of claim 19, wherein the plurality of filtering tasks include more than one of edge boundary strength operations, deblocking pixel filtering, sample adaptive offset (SAO) pixel statistics gathering, and SAO offset application.

23. The apparatus of claim 19, wherein the means for determining the pixel filtering task comprises means for determining a task set for the pixel filtering task, wherein the task set includes a sequence of commands of the instruction set for the instruction set based controller.

24. The apparatus of claim 23, wherein the instruction set comprises a plurality of FETCH instructions for retrieving the pixel data from a memory, a plurality of OPERATIONS instructions for performing one or more pixel filtering operations on the pixel data, and a plurality of SAVE instructions for storing the pixel data to the memory.

25. The apparatus of claim 19, wherein the datapath comprises a first datapath, the plurality of datapaths comprises a first plurality of datapaths, the apparatus further comprising;
means for branching from the determined filtering task to a second filtering task;
selecting a second datapath to perform the determined pixel filtering task from a plurality of second datapaths that are separate from the first plurality of datapaths; and
means for executing the second filtering task using the second datapath.

26. The apparatus of claim 19, further comprising means for transferring the pixel data from an external memory to an internal memory prior to executing the determined filtering task.

27. The apparatus of claim 26, wherein the means for transferring the pixel data comprises means for storing at least one of one or more motion vectors, one or more quantization parameters, pixel data prior to deblocking, pixel data prior to SAO, pixel data post deblocking, and pixel data post SAO operations.

28. A non-transitory computer-readable medium storing instructions that, when executed, cause one or more processors to:
- determine a pixel filtering task from a plurality of pixel filtering tasks for filtering the pixel data, wherein each filtering task of the plurality of pixel filtering tasks is based on an instruction set for a programmable instruction set based controller;
- select a datapath to perform the determined pixel filtering task from a plurality of datapaths defined for the pixel filtering task; and
- execute the determined pixel filtering task on the pixel data using the selected datapath.

29. The non-transitory computer-readable medium of claim 28, wherein the instructions further cause the one or more processors to determine a video coding standard of a plurality of video coding standards associated with the determined pixel filtering task based on an instruction of the instruction set, wherein to select the datapath, the instructions cause the one or more processors to select the datapath from the plurality of datapaths based on the determined video coding standard.

30. The non-transitory computer-readable medium of claim 29, wherein the instructions further cause the one or more processors to execute the determined pixel filtering task for the determined video coding standard by fetching the pixel data from a memory using fetch logic that is common for the plurality of video coding standards and saving processed pixel data to the memory using save logic that is common for the plurality of video coding standards.

31. The non-transitory computer-readable medium of claim 28, wherein the plurality of filtering tasks include more than one of edge boundary strength operations, deblocking pixel filtering, sample adaptive offset (SAO) pixel statistics gathering, and SAO offset application.

32. The non-transitory computer-readable medium of claim 28, wherein to determine the pixel filtering task, the instructions cause the one or more processors to determine a task set for the pixel filtering task, wherein the task set includes a sequence of commands of the instruction set.

33. The non-transitory computer-readable medium of claim 32, wherein the instruction set comprises a plurality of FETCH instructions for retrieving the pixel data from a memory, a plurality of OPERATIONS instructions for performing one or more pixel filtering operations on the pixel data, and a plurality of SAVE instructions for storing the pixel data to the memory.

34. The non-transitory computer-readable medium of claim 28, wherein the datapath comprises a first datapath, the plurality of datapaths comprises a first plurality of datapaths, and wherein the instructions further cause the one or more processors to:
- branch from the determined filtering task to a second filtering task;
- select a second datapath to perform the determined pixel filtering task from a plurality of second datapaths that are separate from the first plurality of datapaths; and
- execute the second filtering task using the second datapath.

35. The non-transitory computer-readable medium of claim 28, wherein the instructions further cause the one or more processors to transfer the pixel data from an external memory to an internal memory prior to executing the determined filtering task.

36. The non-transitory computer-readable medium of claim 35, wherein to transfer the pixel data, the instructions cause the one or more processors to store at least one of one or more motion vectors, one or more quantization parameters, pixel data prior to deblocking, pixel data prior to SAO, pixel data post deblocking, and pixel data post SAO operations.

37. The method if claim 1, wherein selecting the datapath to perform the determined pixel filtering task comprises selecting the datapath based on a format of the pixel data.

* * * * *